United States Patent
Tsay et al.

(10) Patent No.: US 7,182,930 B2
(45) Date of Patent: Feb. 27, 2007

(54) METHODS OF FABRICATING BARIUM TITANATE POWDERS

(75) Inventors: Ming-Tseh Tsay, Longtan Township, Taoyuan County (TW); Zong-Whie Shih, Longtan Township, Taoyuan County (TW); Pao-Yen Lin, Longtan Township, Taoyuan County (TW)

(73) Assignee: Chung Shan Institute of Science and Technology, Taoyuan County (TW)

( * ) Notice: Subject to any disclaimer, the term of this patent is extended or adjusted under 35 U.S.C. 154(b) by 226 days.

(21) Appl. No.: 10/870,463

(22) Filed: Jun. 18, 2004

(65) Prior Publication Data

US 2005/0281733 A1   Dec. 22, 2005

(51) Int. Cl.
*C01F 11/00* (2006.01)
*C01G 1/00* (2006.01)
*C01G 23/00* (2006.01)

(52) U.S. Cl. .................. 423/598; 423/594.16; 423/69; 423/70; 423/71; 423/155; 423/157; 501/137

(58) Field of Classification Search ............... 423/598, 423/594.16, 69, 70, 71, 155, 157; 501/137
See application file for complete search history.

(56) References Cited

U.S. PATENT DOCUMENTS

| | | | |
|---|---|---|---|
| 6,352,681 B1* | 3/2002 | Horikawa et al. | 423/598 |
| 7,001,585 B2* | 2/2006 | Swanson | 423/598 |
| 2003/0044347 A1* | 3/2003 | Shirakawa et al. | 423/598 |
| 2006/0062722 A1* | 3/2006 | Liou | 423/598 |

OTHER PUBLICATIONS

Kim et al, Preparation Of Barium Titanate By Homogeneous Precipitation, 1996, Journal of Materials Science 31, pp. 3643-3645.
Park et al, Particle Size Control Of Barium Titanate Prepared From Barium Titanyl Oxalate, 1997, J. Am. Ceram. Soc., 80, pp. 1599-1604.
Tsay et al, Effects Of Temperature And Atmosphere On The Formation Mechanism Of Barium Titanate Using The Citrate Process, 1996, J. Am. Ceram. Soc., 79, pp. 1693-1696.

* cited by examiner

Primary Examiner—Timothy C. Vanoy
(74) Attorney, Agent, or Firm—Rabin & Berdo, P.C.

(57) ABSTRACT

A method of fabricating barium titanate powders uses titanium tetrachloride and barium hydroxide as reactants in a reaction solution. The pH value of the reaction solution is adjusted to strongly alkaline range by adding potassium hydroxide. Nitrogen is charged into a reaction tank at normal pressure, and the reaction solution is heated at 80–102°. The solution is intensively stirred at constant temperature, and then subjected to a hydro-thermal reflux. Then, the solution is treated through an ion exchange resin and dried to obtain a cubic $BaTiO_3$ powders.

9 Claims, 9 Drawing Sheets

METHODS OF FABRICATING BARIUM TITANATE POWDERS

BACKGROUND OF THE INVENTION

1. Field of Invention

The present invention relates to a method of fabricating barium titanate powders, and more particularly to a method of fabricating barium titanate powders by normal pressure hydraulic thermal circulation technology.

2. Related Art

Electronic products are being developed in the light and compact trend. High capacity, high operation speed and high reliability are elementary for a newly developed electronic product. High-dielectric constant materials provide the optimal solution to meet the above requirements.

The steatite was used as a dielectric due to its low dielectric constant in the early research years. In 1925, a titanium dioxide ceramic capacitor with a dielectric constant higher than 10 was successfully commercialized. At the time of the Second World War, the dielectric constant of the ceramic capacitor increased to thousands due to the discovery of barium titanate. Barium titanate has drawn interest as a material of electronic appliances due to its high dielectric constant, high piezoelectric constant, low dielectric loss, high impedance, high mechanical-electrical coupling constant and polarizing ability. Therefore, barium titanate can be broadly applied as, for example, MLCC, resistor, resonator, thermistor, tone transducer, semiconducing ceramic and electromagnet absorbant.

A conventional method of fabricating barium titanate powders includes a solid stated method, a precipitation method, a sol-gel method and a high-temperature high-pressure thermal method, which will be described more detailed later.

The solid stated method mixes barium carbonate with titanium dioxide and then performs sintering at high temperature to form barium titanate. However, the barium titanate thus obtained has low purity, and a large and non-uniformly distributed particle diameter. Therefore, the barium titanium obtained by this method is not suitable for application of electronic products.

The precipitation method decreases the distance between atoms to accelerate the solid-phase reaction. Cations required for the reaction are mixed with and intensively stirred in a solution in an amount proportional to reactants. Precipitants may be added to facilitate the deposition. With the reduction of distance between cations from micrometer level to nanometer level, barium titanate powders can be obtained by low-temperature sintering.

There are two methodes of fabricating barium titanate powders by using different precipitants: an oxalate method and a citrate method.

Kim et al. disclose to form barium titanate by using oxalate method in which titanium chloride, barium chloride, and oxalic acid or diethyl oxalate are used as reactants to form $BaTiO(C_2O_4)_2 \cdot 4H_2O$, J. Mater. Sci., 31(1996), p. 3643–3645 and Park et al. (J. Am. Ceram. Soc., 80(1997), p. 1599–1604. $BaTiO(C_2O_4)_2 \cdot 4H_2O$ is sintered in an oven at high temperature to form cubic barium titanate. Then, a heat treatment is performed to obtain tetragonal barium titanate. This method is simpler and thus has been successfully commercialized. However, all the particles obtained have particle diameters at sub-micrometer level, broad diameter distribution, significant coagulation and poor particle quality. Therefore, it cannot be applied in high-reliability electronic products.

The citrate method is similar to the oxalate method. Ti $(OC_4H_9)_4$ and citric acid are dissolved in ethylene glycol, and then mixed with $BaCO_3$ in formic acid. The pH value of formic solution is adjusted to form $BaTi(C_6H_6O_7)_3 \cdot 6H_2O$, Tsay and Fang, J. Am. Ceram. Soc., 79(1996), p. 1693–1696. Then, a heat treatment is performed to obtain barium titanate.

Although the product obtained by this method is similar to that by oxalate method, the use of expensive titanium alkoxide as raw material and the use of an organic solvent results in a low economic effect.

A sol-gel method has been proposed to avoid the fact that cations cannot be deposited at the same time due to over saturation in the deposition method. The sol-gel method intensively mixes cation compounds required for reaction. When water is added, the hydrolysis occurs to form solgel. After the solvent is removed, a polymerization occurs to form gel. Then a sintering method is performed after drying. Since cation alcohol compounds quickly reactions with water to occur hydrolysis, and the product M $(OR)x-1(OH)$ and alkoxide or the product itself polymerize with one another, all cations can form crystals to obtain stoichiometric end products.

The method of fabricating high-purity barium titanium using titanium or barium as raw materials includes:

(a) an alkoxide-derived powders method: hydrolysis and dissolution of $Ti(OR_1)_4$ and $Ba(OR_2)_2$ occur simultaneously to form fine and high-purity barium titanate crystalline powders. The powders are sintered at 500–700° C. in inert gas to remove the residual carbon so as to avoid the fabricating of $BaCO_3$. The reaction mechanism is as follows:

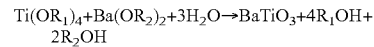

The product obtained by this method has purity higher than oxalate and citrate. However, the main disadvantage is that the alkoxide is high in cost and sensitive to water.

(b) an alkoxide-derived gel method: this method improves the disadvantage of the above method. Ti $(OR)_4$ and $Ba(OR)_2$ form an amorphous gel at low temperature. The gel is then sintered at high temperature (higher than 400–600° C. to form barium titanate crystals.

(c) sol-precipitation: Ti $(OR)_4$ reacts with acetic acid to form white titanyl acylate precursors. The precursors make polymers solvable in excess of water. Hydroxy titanium acylate is formed to avoid the hydrolysis of titanium alkoxide. The method uses as raw material barium acetate that is much more inexpensive and not so sensitive to moisture. The barium acetate is mixed with titanyl acylate precursors to obtain a barium titanium gel. Then, NaOh solution is added at 85° C. to obtain high-purity cubic barium titanate.

(d) a sol-gel method: it is similar to the above sol-precipitation method, except that the white titanyl acylate precursors are added into a barium acetate solution, instead of mixed with water, at 25–70° C. to conduct gelation. An amorphous barium titanate gel is obtained. The gel is sintered at 700–1000° C. to form tetragonal barium titanate.

As described above, the sol-gel method uses expensive titanium or barium alkoxide as raw material, which is expensive, and the chemical properties of the raw material are unstable. Furthermore, the method is not easy to control, causing difficulty in scale-up production.

A high-reactivity thermal method is used to keep the cations in atom state. The reactant solution is placed in a close reactor. The temperature and pressure in the reactor increase to facilitate the chemical reaction of the cations. A solid-liquid separation method is used to obtain solids from the product solution. Sintering can be optionally performed to help complete the reaction. The thermal reaction partially dissolves the reactants at high temperature and pressure to become thermal decomposition or oxidation to form crystalline powders. This method has attracted many studies in recent years. Thermal reaction at high temperature and pressure to form barium titanate needs expensive equipment, but lacks high operation safety. Besides, the powders can be made only in batch.

Therefore, there is a need of a method of fabricating high-quality barium titanate powders using inexpensive raw materials.

SUMMARY OF THE INVENTION

It is therefore an object of the invention to provide a method of fabricating barium titanate powders by hydro-thermal reflux at normal pressure, using an inexpensive inorganic salt as raw material. Thereby barium titanate powders are produced with low cost and high mass-production quality.

The method of fabricating barium titanate powders according to the invention includes using ammonium to hydrolyze a dilute titanate chloride in a reactor. Then, a barium hydroxide solution is added. A potassium hydroxide is added to adjust the reaction solution in strongly alkaline ranges so as to increase the reactivity of the reaction solution. Nitrogen is charged in the reactor at normal pressure. The solution is heated to 80–102° C., stirred at a constant temperature and subjected to a hydro-thermal reflux. Then, the solution is treated by an anion/cation exchange resin tower and dried to obtain high-quality barium titanate powders.

In the invention inexpensive inorganic salt is used as raw material to effectively reduce production cost, and water is used as a solvent instead of toxic organic solvent well used in the prior art, ensuring safety in the manufacture method. Since the reaction safety at normal pressure and low temperature is high, the method of the invention can be practiced under continuous control. Therefore, the equipment usage can be increased while the production cost is significantly reduced.

In addition, the barium titanate powders obtained by the invention have uniformly-distributed a particle diameter, high specific surface area, high cyrstallinity and good dispersability, improving prior-art disadvantages such as a non-uniformly distributed and large particle diameter of barium titanate powders obtained by a high-temperature solid method, and serious coagulation.

BRIEF DESCRIPTION OF THE DRAWINGS

The present invention will become more fully understood from the detailed description given in the illustration below only, and thus does not limit the present invention, wherein.

DETAILED DESCRIPTION OF THE INVENTION

Figure 1:
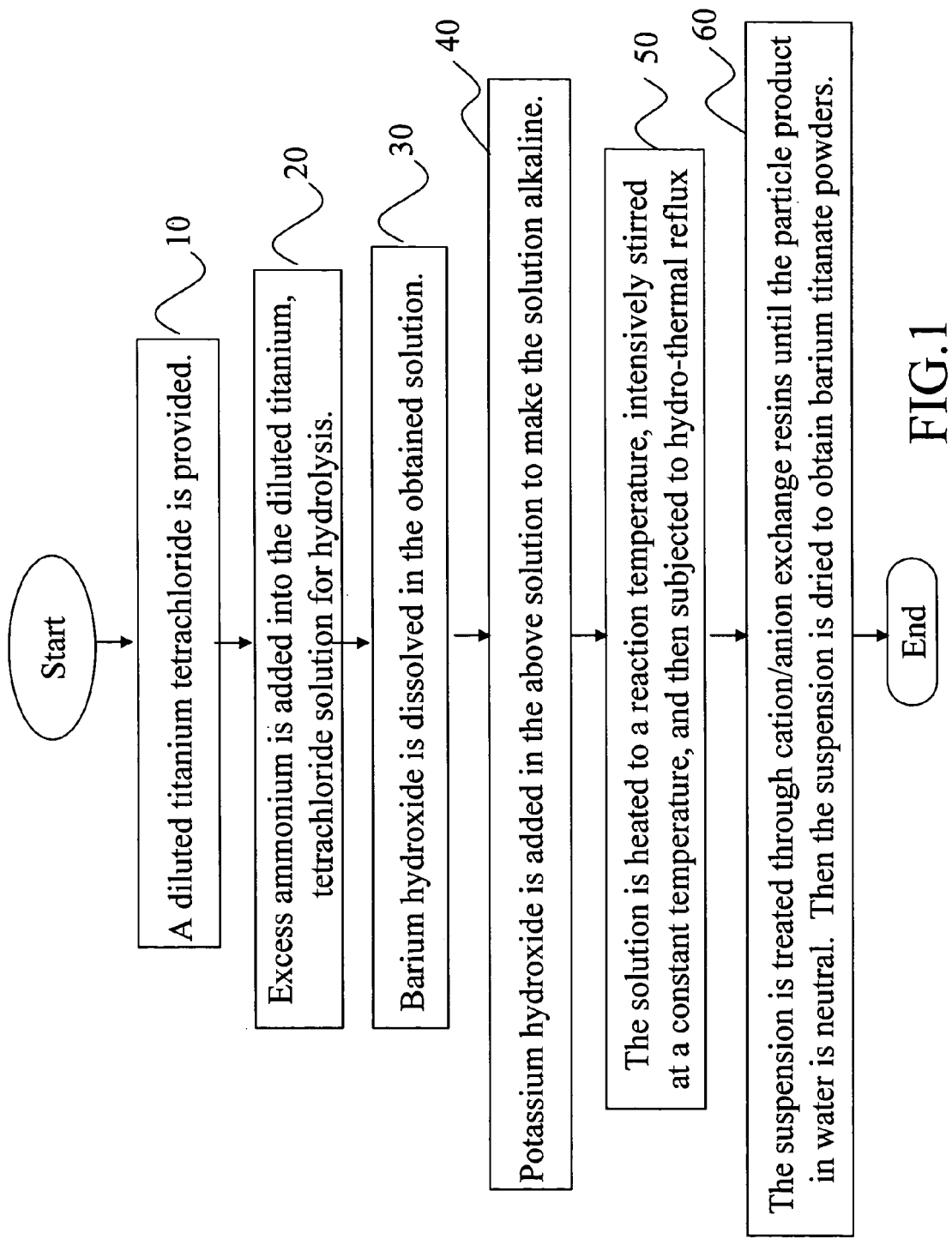
FIG. 1 is a flowchart of a method of fabricating barium titanate powders according to one embodiment of the invention.

FIG. 1 is a flowchart of a method of fabricating barium titanate powders. A diluted titanium tetrachloride is provided (step 10). In the invention, titanium tetrachloride is a titanium source of the product barium titanate. A titanium tetrachloride aqueous solution is prepared by placing a small amount of water in a reactor full of nitrogen, slowly dropping an appropriate amount of titanium tetrachloride into water, and then diluting the solution to a predetermined concentration. The titanium tetrachloride aqueous solution thus obtained is clear. The diluted titanium tetrachloride solution has a concentration ranging from 5 to 20 wt %, preferably from 6 to 8 wt %.

Excess ammonium is added into the diluted titanium, tetrachloride solution for hydrolysis (step 20). The concentration of ammonium ranges form 20 to 28 wt %. The amount of ammonium added in the titanium tetrachloride solution must be larger than the stoichiometric amount so that the titanium tetrachloride is completely hydrolyzed into $TiO_2 \cdot xH_2O$. The molar ratio of ammonium to titanium tetrachloride ranges form 4 to 8, preferably from 6 to 7.

During hydrolysis, the pH value of the titanium tetrachloride solution increases to neutral range as ammonium is added. At this time, the solution turns into gel. After the ammonium is continuously added so that the pH value of the titanium tetrachloride gel exceeds 8, the gel can turn into solgel. The ammonium is hydrolyzed as described below:

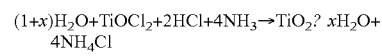

$$(1+x)H_2O + TiOCl_2 + 2HCl + 4NH_3 \rightarrow TiO_2 \cdot xH_2O + 4NH_4Cl$$

Then, barium hydroxide is dissolved in the obtained solution (step 30). At this step, barium hydroxide is added as a barium source of product barium titanium. Barium hydroxide is an industrial stock that always contains traces of purities such as barium carbonate. Therefore, barium hydroxide must be purified before use. Barium hydroxide purification may include dissolving, filtering and re-crystallizing.

Purified barium hydroxide is dissolved in a proper amount of water, and then added in the solgel. The molar ration of barium hydroxide and titanium tetrachloride is in the range of 1.0–1.4, preferably in the range of 1.15–1.2.

Potassium hydroxide is added in the above solution to make the solution alkaline (step 40) increase reactivity of the product barium titanate to be formed. Potassium hydroxide is preferably added in the form of solid particles to avoid low solid content in the product, and thus to increase usage of the reactor. Potassium hydroxide is added so that the pH value of the reaction solution is higher than 12, and is preferably between 13 and 14.

Nitrogen is charged in the reactor at normal pressure. The solution is heated to a reaction temperature, intensively stirred at a constant temperature, and then subjected to hydro-thermal reflux (step 50). The purpose of charging nitrogen into the reactor is to stop carbon dioxide in the air from reacting with barium ions in the solution to form barium carbonate, which adversely affects the formation of the product barium titanate.

The reaction temperature of the hydrothermal reflux is about 80–102° C., and preferably 95–102° C. The reaction time of the hydrothermal reflux is about 1–5 hours and preferably 1–3 hours. Formation of barium titanium is conducted as follows.

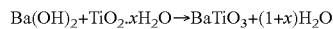

$$Ba(OH)_2 + TiO_2 \cdot xH_2O \rightarrow BaTiO_3 + (1+x)H_2O$$

After the hydrothermal reflux is completed (step 50), the product is cooled to room temperature and subjected to solid-liquid separation. The solid thus obtained is suspended in water. The suspension is treated through cation/anion exchange resins until the particle product in water is neutral. Then the suspension is dried to obtain barium titanate powders (step 60).

The invention is exemplified by the following description. However, the invention is not limited to those examples below.

EXAMPLE 1

10.1 g of titanium tetrachloride is dissolved in water to prepare a 6.5 wt % solution. The 6.5 wt % solution is charged in a reactor. 16.5 g of 25 wt % ammonium is added into the reactor to hydrolyze the titanium tetrachloride and form $TiO_2 \cdot xH_2O$. The solution is intensely stirred. 21.9 g of purified barium hydroxide is completely dissolved in 50.0 g of water, the ratio of barium to titanium being about 1.3. The barium hydroxide aqueous solution is added in the reactor. 17 g of solid potassium hydroxide is added in the reactor to adjust the pH value of then reaction solution in the reactor higher than 12. Nitrogen is charged in reaction solution at normal pressure. Then the reaction solution is intensively stirred, and subjected to hydrothermal reflux for 3 hours at 102° C. After the reaction is completed, the temperature is decreased to room temperature. The obtained solution is subjected to a solid-liquid separation. The solid product is suspended in water and then treated by anion/cation exchange resin tower until it is substantially neutral. Then the solid product is spray dried to obtain barium titanate powders.

Figure 2:
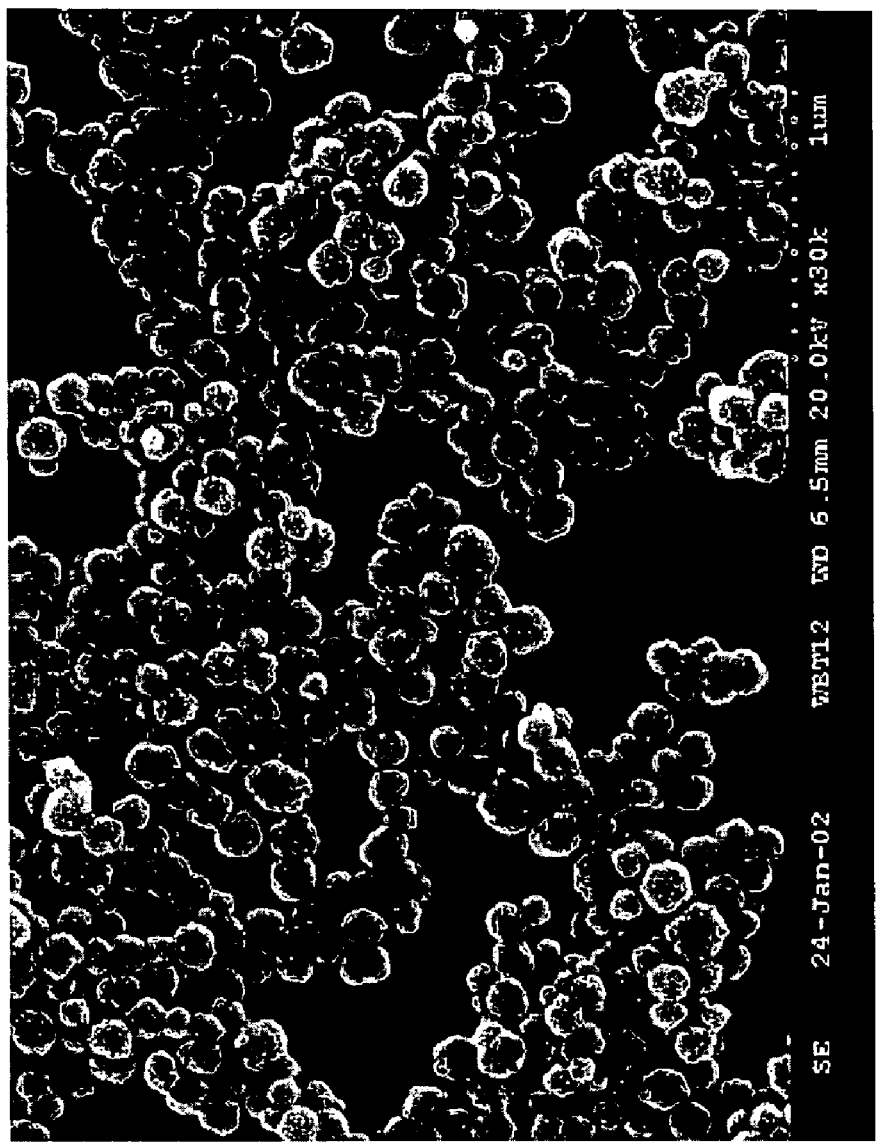
FIG. 2 is an electronic microscope graph of barium titanate powders obtained in Example 1 of the invention.

FIG. 2 is an electronic microscope graph of barium titanate powders obtained in Example 1. The powders have a primary particle diameter of about 90 nm with uniform distribution, have a spherical shape, and 14.38 m$^2$/g of specific surface area.

Figure 3:
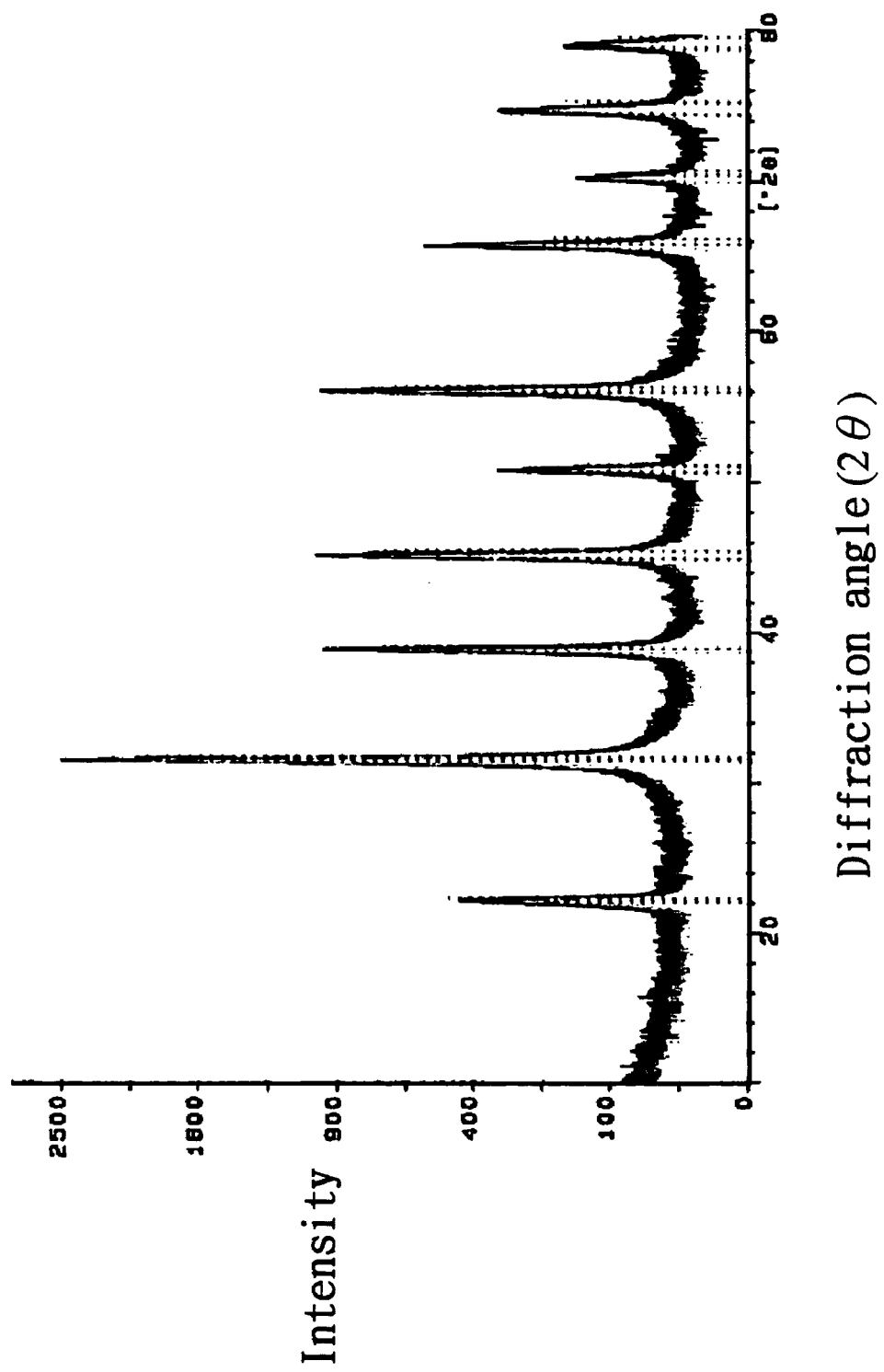
FIG. 3 is an X-ray diffraction graph of barium titanium powders obtained in Example 1 of the invention.

FIG. 3 is an X-ray diffraction graph of barium titanium powders obtained in Example 1. It is found that the powers have a cubic crystal structure, good crystallinity without other phases.

EXAMPLE 2

10.1 g of titanium tetrachloride is dissolved in water to prepare a 6.6 wt % solution. The 6.5 wt % solution is charged in a reactor. 16.5 g of 25 wt % ammonium is added into the reactor to hydrolyze the titanium tetrachloride and form $TiO_2 \cdot xH_2O$. The solution is intensely stirred. 21.9 g of purified barium hydroxide is completely dissolved in 50.0 g of water, the ratio of barium to titanium being about 1.3. The barium hydroxide aqueous solution is added in the reactor. 29 g of solid potassium hydroxide is added in the reactor to increase the pH value of the reaction solution. Nitrogen is charged in reaction solution at normal pressure. Then the reaction solution is intensively stirred, and subjected to hydro-thermal reflux for 3 hours at 102° C. After the reaction is completed, the temperature is decreased to room temperature. The obtained solution is subjected to a solid-liquid separation. The solid product is suspended in water and then treated by anion/cation exchange resin tower until it is substantially neutral. Then the solid product is spray dried to obtain barium titanate powders.

Figure 4:
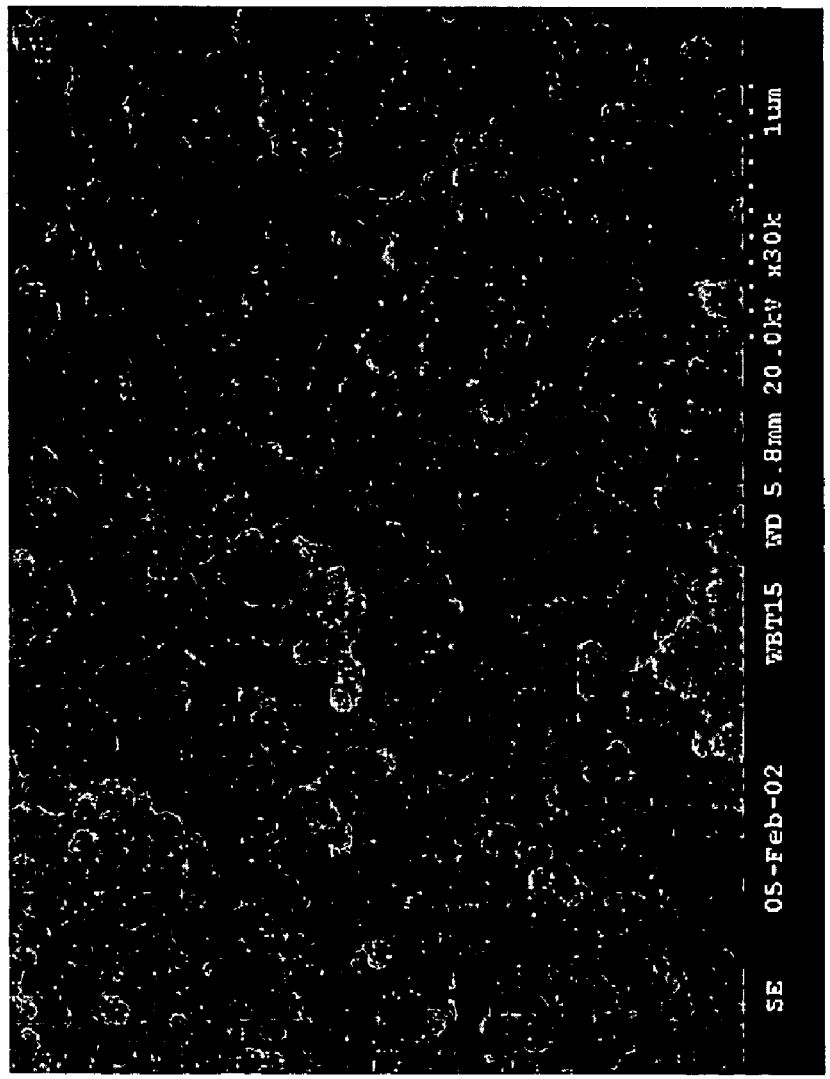
FIG. 4 is an electronic microscope graph of barium titanate powders obtained in Example 2 of the invention.

FIG. 4 is an electronic microscope graph of barium titanate powders obtained in Example 2. The primary particle diameter of the powders is about 73 nm with uniform distribution, have a spherical shape and 25.928 m$^2$/g of specific surface area. Comparing the powders obtained in Example 1 to those in Example 2, it is found that the higher the pH value of the reaction solution, the smaller the primary particle diameter of the obtained product is, while the higher the specific surface area thereof is.

EXAMPLE 3

10.14 g of titanium tetrachloride is dissolved in water to prepare a 6.5 wt % solution. The 6.5 wt % solution is charged in a reactor. 16.6 g of 25 wt % ammonium is added into the reactor to hydrolyze the titanium tetrachloride and form $TiO_2 \cdot xH_2O$. The solution is intensely stirred. 18.41 g of purified barium hydroxide is completely dissolved in 50.0 g of water, the ratio of barium to titanium in stock being about 1.1. The barium hydroxide aqueous solution is added in the reactor. 29 g of solid potassium hydroxide is added in the reactor to increase the pH value of the reaction solution. Nitrogen is charged in reaction solution at normal pressure. Then the reaction solution is intensively stirred, and subjected to hydrothermal reflux for 3 hours at 102° C. After the reaction is completed, the temperature is decreased to room temperature. The obtained solution is subjected to a solid-liquid separation. The solid product is suspended in water and then treated by an anion/cation exchange resin tower until it is substantially neutral. Then the solid product is spray dried to obtain barium titanate powders.

Figure 5:
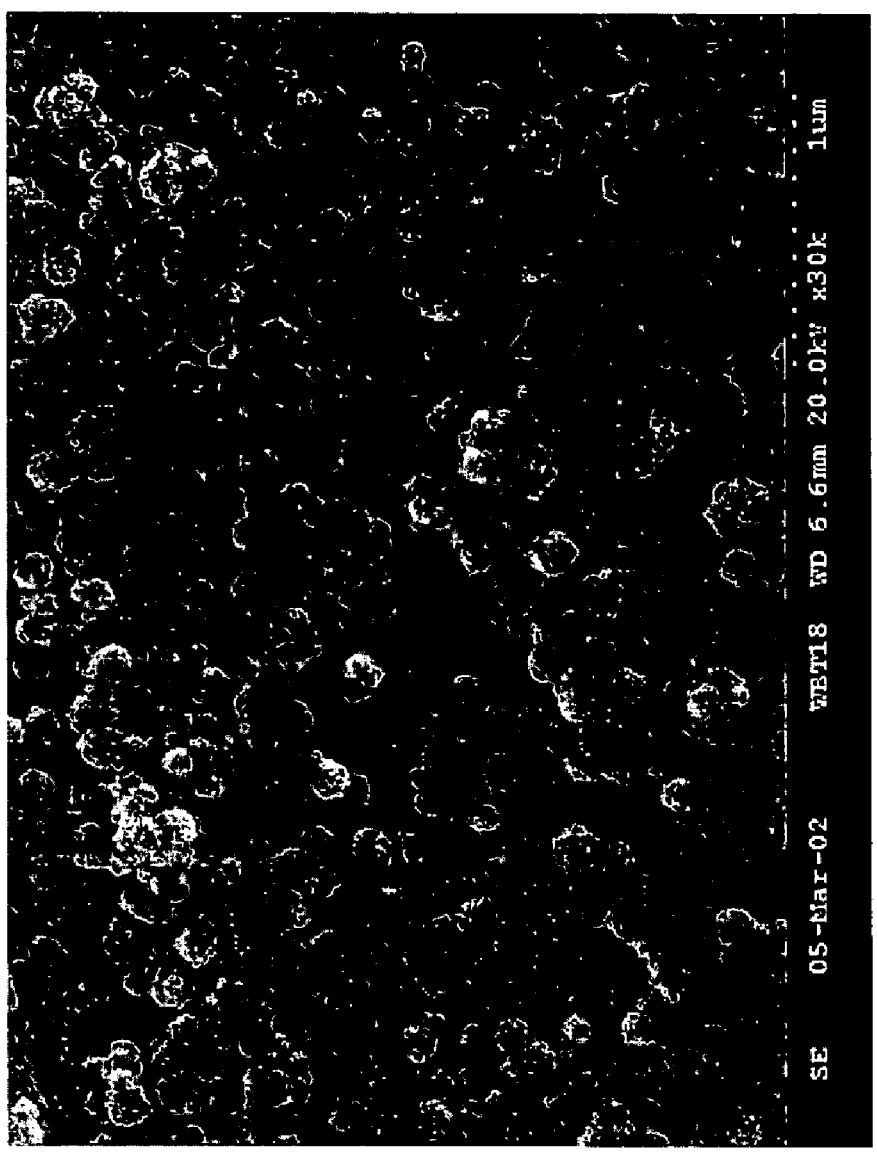
FIG. 5 is an electronic microscope graph of barium titanate powders obtained in Example 3 of the invention.
Figure 6A:
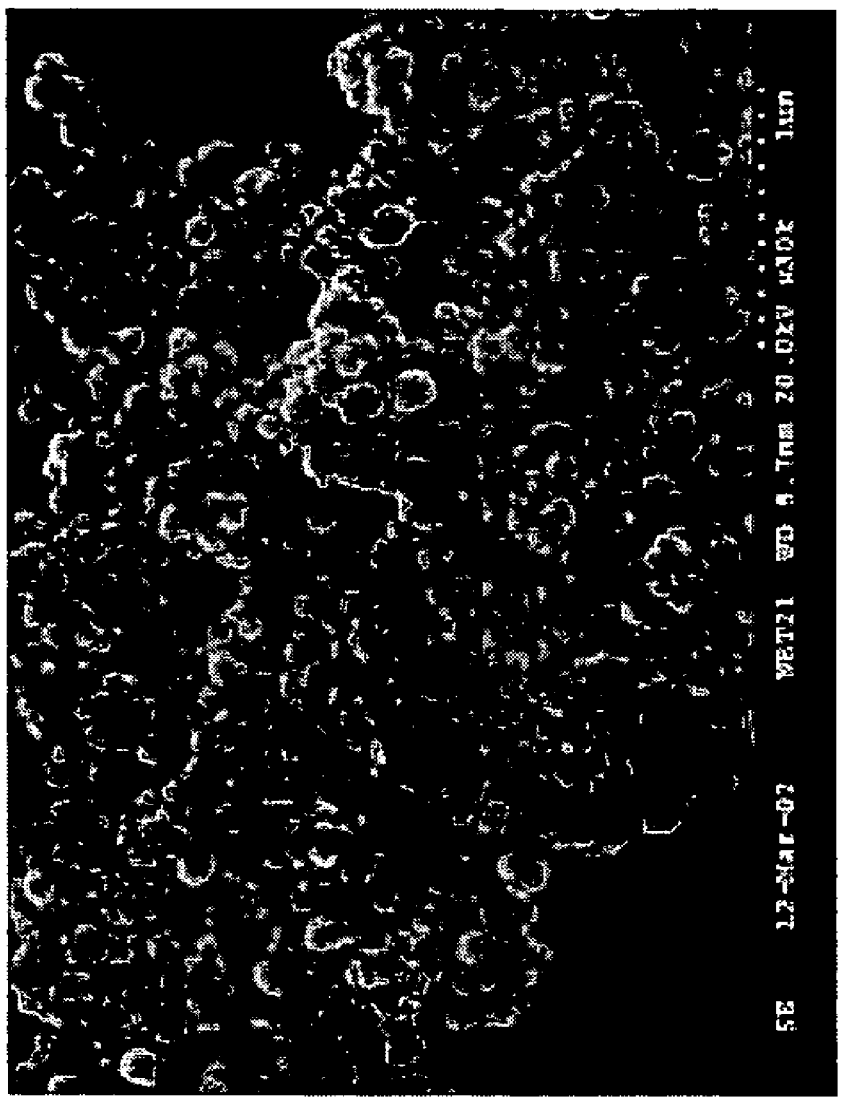
FIGS. 6A to 6D are electronic microscope graphs of barium titanate powders obtaining different reaction time conditions (1, 2, 2.5 and 4 hours); and Table 1 shows the specific surface area and particle diameter of the obtained powders at different reaction time conditions (1, 2, 2.5 and 4 hours).
Figure 6B:
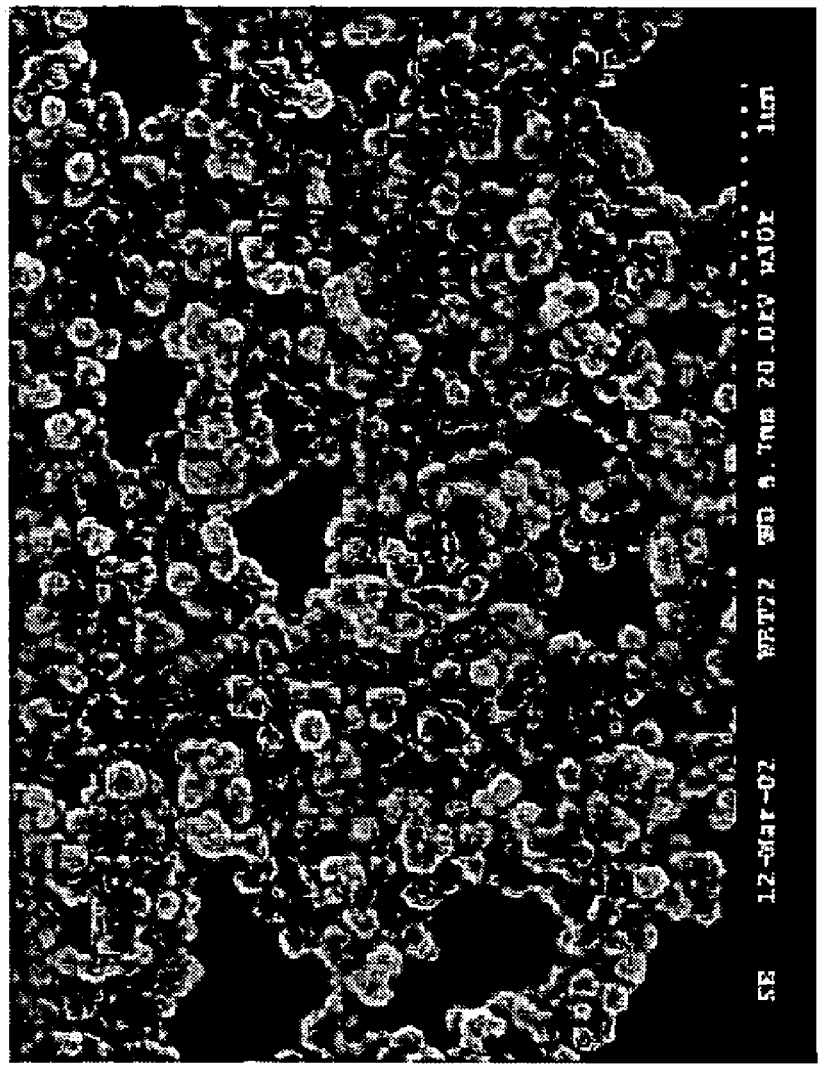
Figure 6C:
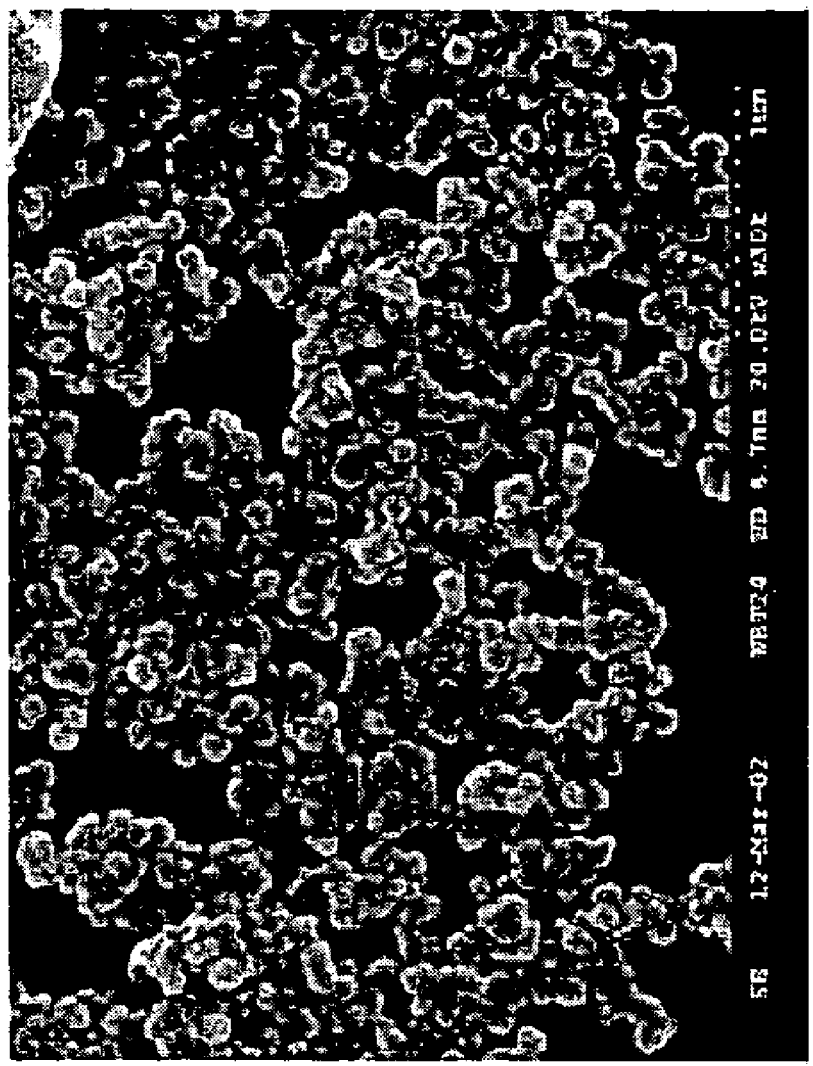
Figure 6D:
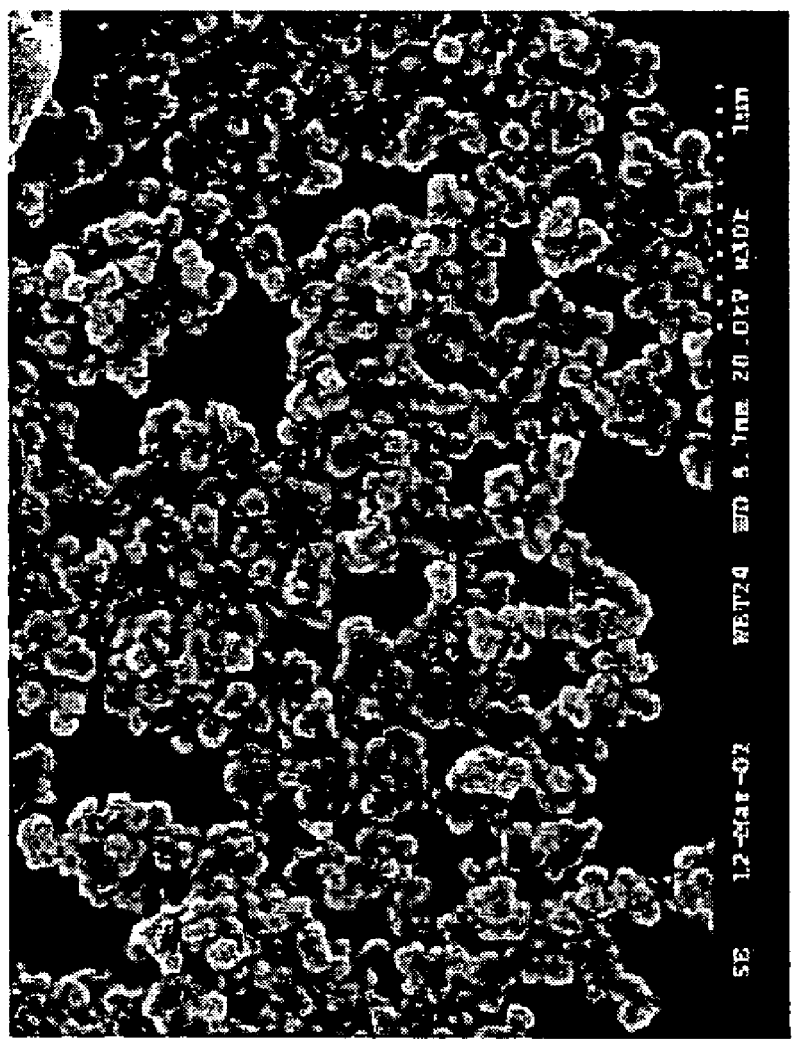

FIG. 5 is an electronic microscope graph of barium titanate powders obtained in Example 3. The powders have a primary particle diameter of about 95 nm, have a spherical shape and 26.16 m$^2$/g of specific surface area. It is found that the smaller the ratio of barium to titanium in stock, the larger the primary particle diameter of the obtained product is.

EXAMPLE 4

In this example, the influence of hydrothermal reflux reaction time on the particle diameter is studied. 10.0 g of titanium tetrachloride is dissolved in water to prepare a 6.5 wt % solution. The 6.5 wt % solution is charged in a reactor. 16.5 g of 25 wt % ammonium is added into the reactor to hydrolyze the titanium tetrachloride and form $TiO_2 \cdot xH_2O$. The solution is intensely stirred. 21.5 g of purified barium hydroxide is completely dissolved in 50.0 g of water. The barium hydroxide aqueous solution is added in the reactor. 28.5 g of solid potassium hydroxide is added in the reactor to increase the pH value of the reaction solution. Nitrogen is charged in reaction solution at normal pressure. Then the reaction solution is intensively stirred, and subjected to hydrothermal reflux at 102° C. for 1, 2, 2.5, and 4 hours, respectively. After the reaction is completed, the temperature is decreased to room temperature. The obtained solution is subjected to a solid-liquid separation. The solid product is suspended in water and then treated by anion/cation exchange resin tower until it is substantially neutral. Then the solid product is spray dried to obtain barium titanate powders.

Table 1 shows the specific surface area and particle diameter of the obtained powders at different reaction time conditions (1, 2, 2.54 and 4 hours). FIG. 6A to 6D are electronic microscope graphs of barium titanate powders obtaining different reaction time conditions (1, 2, 2.54 and 4 hours).

From Table 1 and FIG. 6A to 6D, it is found that the reaction time rarely affects the specific surface area and particle diameter of the obtained powders. Therefore, barium titanate powders with uniform particle distribution.

It will be apparent to the person skilled in the art that the invention as described above may be varied in many ways, and notwithstanding remaining within the spirit and scope of the invention as defined in the following claims.

TABLE 1

| Reaction time (Hour) | specific surface area ($m^2/g$) | particle diameter of the obtained powders measured by an electronic microscope (nm) |
|---|---|---|
| 1 | 31.43 | 73 |
| 2 | 28.77 | 75 |
| 2.5 | 27.24 | 75 |
| 4 | 28.09 | 76 |

What is claimed is:

1. A method of fabricating barium titanate powders made from titanium tetrachloride and barium hydroxide as raw materials, comprising:
   (a) providing a titanium tetrachloride solution;
   (b) adding excess ammonium aqueous solution into the titanium tetrachloride solution;
   (c) adding a barium hydroxide aqueous solution into the titanium tetrachloride solution;
   (d) adding a potassium hydroxide into the titanium tetrachloride solution to adjust the pH value of the titanium tetrachloride solution into a strongly alkaline range;
   (e) heating the titanium tetrachloride solution to a reaction temperature at normal pressure in a nitrogen-containing environment, and performing a stable hydro-thermal reflux reaction for the titanium tetrachloride solution; and
   (f) after the hydro-thermal reflux reaction is completed, a product thereof is treated by an ion exchange resin until the product is substantially neutral, and then is dried to obtain barium titanate powders.

2. The method of claim 1, wherein at the step (a), the titanium tetrachloride solution has a concentration of 5–20 wt %.

3. The method of claim 1, wherein at the step (b), the ammonium aqueous solution has a concentration of 20–28 wt %.

4. The method of claim 1, wherein at the step (b), the molar ratio of ammonium to titanium tetrachloride is in the range of 4–8.

5. The method of claim 1, wherein at the step (c), the molar ratio of barium hydroxide to titanium tetrachloride is between 1~1.4.

6. The method of claim 1, wherein at the step (d), the potassium hydroxide is in solid state with an amount that is enough to make pH value of the titanium tetrachloride solution larger than 12.

7. The method of claim 1, wherein at the step (e), the reaction temperature of the hydro-thermal reflux ranges from 80 to 102°.

8. The method of claim 1, wherein at the step (e), the reaction time of the hydro-thermal reflux ranges from 1 to 5 hours.

9. The method of claim 1, wherein at the step (f), the drying temperature ranges from 100 to 120°.

* * * * *